No. 814,790. PATENTED MAR. 13, 1906.
W. R. MARENTETTE.
VEHICLE HEATER.
APPLICATION FILED APR. 14, 1905.

2 SHEETS—SHEET 1.

WITNESSES:
Lewis E. Flanders
Paul S. Miller

INVENTOR.
William R. Marentette
BY
Bartlett & Bartlett
ATTORNEYS.

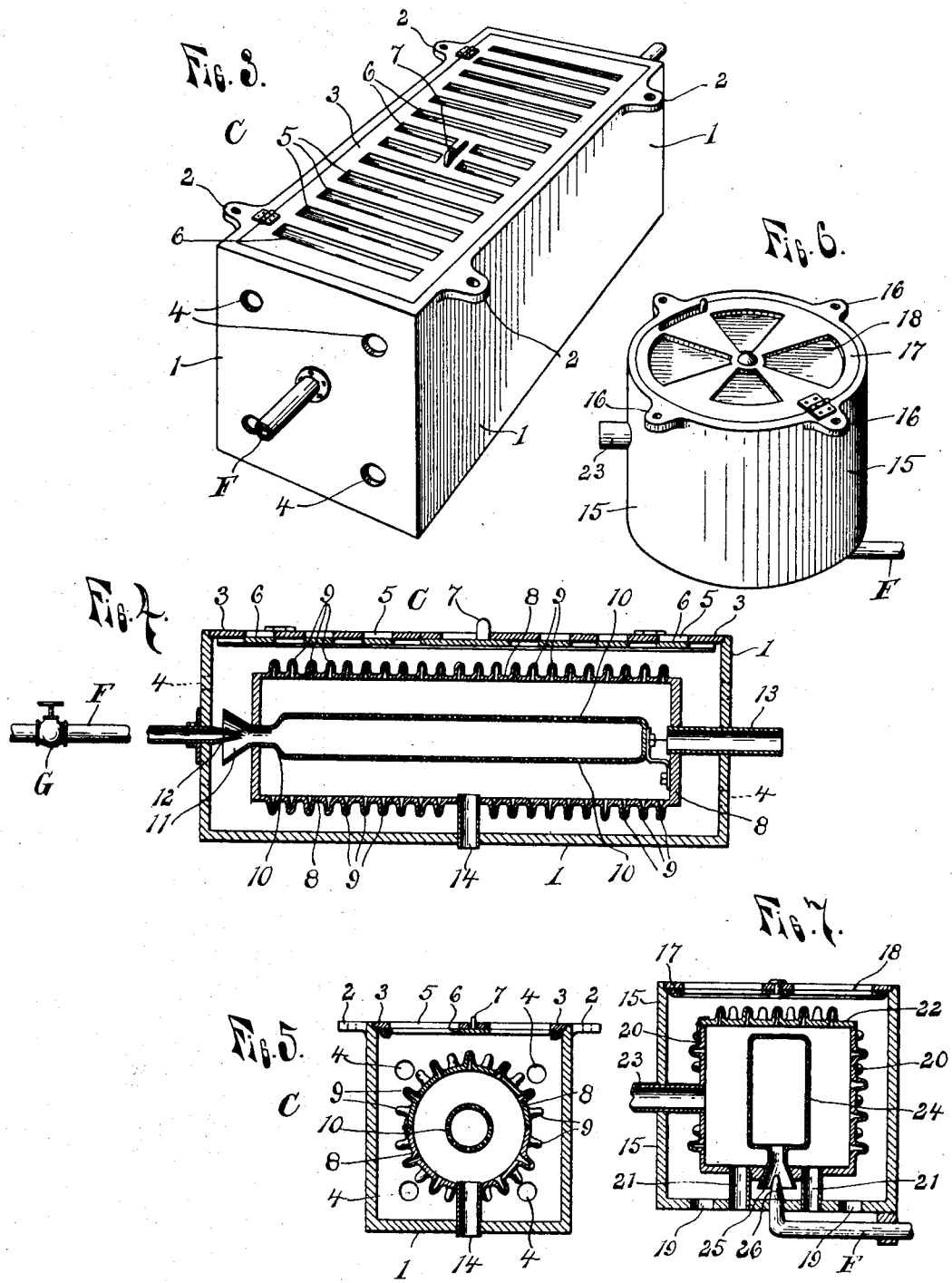

UNITED STATES PATENT OFFICE.

WILLIAM R. MARENTETTE, OF DETROIT, MICHIGAN.

VEHICLE-HEATER.

No. 814,790.  Specification of Letters Patent.  Patented March 13, 1906.

Application filed April 14, 1905. Serial No. 255,478.

*To all whom it may concern:*

Be it known that I, WILLIAM R. MARENTETTE, a subject of the King of Great Britain, residing at Detroit, in the county of Wayne and State of Michigan, have invented certain new and useful Improvements in Vehicle-Heaters, of which the following is a specification, reference being had therein to the accompanying drawings.
This invention relates to improvements in heaters for vehicles, and more especially to heaters for closed carriages—such as hacks, omnibuses, &c.—the object of the same being to provide an efficient oil or vapor burning heater which is so constructed that none of the fumes, gases, or smoke from the oil or burner can in any way get into the carriage and so as to adapt the heater to be readily attached to the carriage where none of the useful inside space will be taken up thereby and where the heated air will pass directly into the vehicle in the most effective manner.

It is also an object of the invention to so construct the heater that the pure outside air will be drawn in, heated, and passed into the carriage, thus driving out the foul air therein and creating a circulation and to arrange the device so that all of its parts are readily accessible and so that it may be accurately regulated from the inside of the vehicle.

Figure 1:
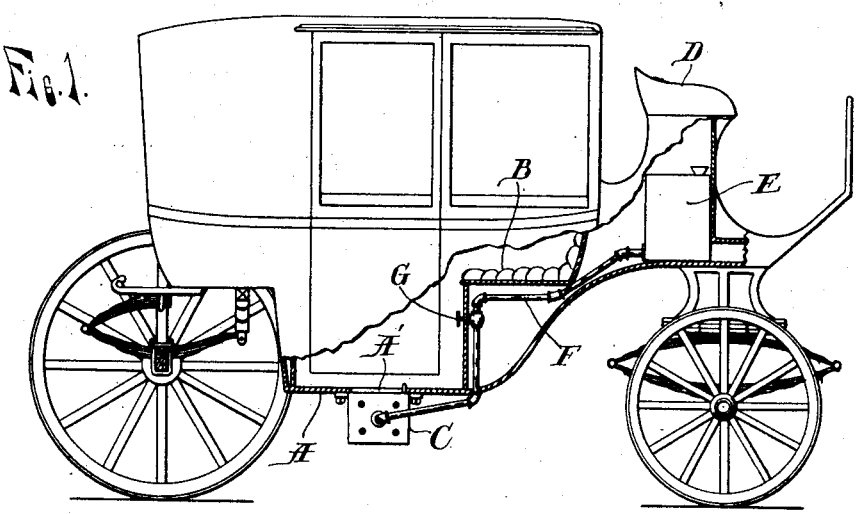
Figure 2:
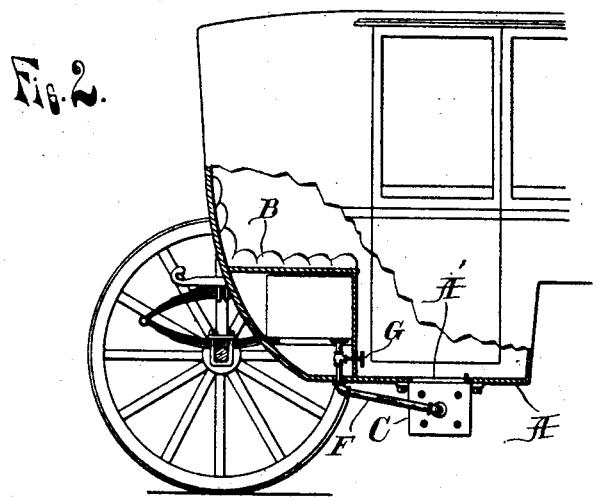

A further object of the invention is to provide a cheap and simple construction which may be readily cleaned or repaired and which is provided with certain other new and useful features and has the several advantages of the particular construction, arrangement, and combination of parts, all as hereinafter more fully described, reference being had to the accompanying drawings, in which—
Figure 1 is a side elevation of a carriage with parts broken away to show the heater in operative position; Fig. 2, a partial side elevation of a carriage with parts broken away and showing a modified arrangement of the supply-tank. Fig. 3 is a perspective view of the heater; Fig. 4, a longitudinal vertical section of the same; Fig. 5, a transverse section of the heater. Fig. 6 is a perspective view of a modified form of heater, and Fig. 7 a vertical section through the same.

As shown in the drawings, A is the bottom or floor of the carriage-body between the opposed seats B, an opening A' being provided in said floor, and a heater C is secured to the under side of said bottom opposite the opening.

D is the driver's seat at the front of the vehicle, beneath which the oil-supply tank E may be placed, and a supply-pipe F extends from said tank downward through the body beneath the forward seat and out through the bottom to the heater, a regulating-valve G being placed in said pipe beneath the seat with its stem extending outward through the vertical apron or wall beneath the forward edge of the seat, where it is provided with a handle which is readily accessible to the occupants of the carriage.

Where the carriage-body is constructed with a sufficient space beneath the rear seat B, as shown in Fig. 2, or beneath either of said seats, the tank may be placed in this space and connected with the heater by the supply-pipe, as shown, or said tank may be located in any other suitable space in the vehicle, according to the construction of the body.

The heater C consists of a suitable rectangular casing 1, provided with apertured ears 2, projecting from its sides at the upper edges thereof, by means of which said casing is secured by bolts to the under side of the carriage-floor with its door or hinged cover 3 opposite the opening A' in the floor. The casing is thus hung beneath the vehicle-body and outside air is admitted to the casing through holes 4 in its ends, where it is heated and discharged through openings or slits 5 in the cover 3, which slits are controlled by a slide 6, operated by a lug or handle 7, projecting upward through the cover where the occupants of the carriage may readily move the same to open or close the slits and regulate the admission of the heated air to the carriage.

Supported within the casing 1 in any suitable manner is a cylindrical radiator 8, made in halves hinged together at one side, said halves being each formed with radially-projecting hollow protuberances 9 to increase the radiating-surface, and supported within the longitudinal axis of the radiator is a perforated burner-tube 10, which extends at one end through an opening in the end of the radiator and is provided with a funnel-shaped end 11, into which projects for a short distance a nozzle or contracted point 12 on the end of the oil-supply pipe, said pipe being extended through an opening in the end of the casing and secured therein. Extending through an opening in the opposite end of said casing and also through an opening in the adjacent end of the radiator is a discharge or exhaust pipe 13, through which the odors and products of combustion escape into the open air beneath the vehicle, and a pipe 14, extending through the bottom of the radiator and casing, supplies air to the radiator to maintain combustion therein.

The oil issues from the nozzle 12 in a fine spray and entering the burner-tube draws in through the funnel a sufficient quantity of air to mix therewith and form a combustible vapor, which passes through the fine jet openings in the tube and burns in small jets within the closed radiator, the halves of which fit together tightly enough to prevent any gases or products of combustion from escaping into the casing and passing therefrom into the carriage. The burner may be readily lighted or the interior cleaned or repaired from the inside of the carriage by raising the cover 3 and the hinged upper half of the radiator.

In Figs. 6 and 7 is shown a modified form of heater, the difference being principally in the shape and size of the same rather than in the construction, the casing 15 being cylindrical or circular in form and provided with ears 16 at one end for its attachment to the floor of the vehicle. A circular cover 17 fits the upper open end of the casing, and a discous slide or damper 18 is provided to close the openings therein. Air-intake openings 19 are provided in the lower end of the casing, and a radiator 20 of a shape to correspond to the shape of the casing is supported therein by pipes 21, opening through the bottom of the radiator and also through the casing, which pipes also serve to supply air to the radiator to maintain combustion therein. The radiator is formed with hollow protuberances, as is also its cover 22, which is hinged to its upper end, and an exhaust or discharge pipe 23 extends through the side of the radiator and casing to draw off the products of combustion. A vertically-extending perforated burner-tube 24 extends in the axis of the radiator, and a funnel-shaped end 25 on said tube extends through the bottom of the radiator to receive the spray-nozzle 26 on the end of the supply-pipe, which extends upward through the bottom of the casing.

On certain styles and sizes of vehicles it may be found desirable to use the modified form of burner; but as its operation is substantially the same as that of the first described burner I do not wish to confine myself to this or any other particular form or configuration.

Having thus fully described my invention, what I claim is—

1. In a vehicle-heater, the combination of a casing provided with openings for the admission of air and having an open top, laterally-projecting ears on the sides of the casing at their upper edges by means of which the casing is attached to the bottom of a vehicle-body, a cover hinged to the casing to close the top thereof and provided with openings for the escape of the heated air, a slide carried by said cover to close the openings, a cylindrical radiator provided with hollow protuberances on its surface supported within the casing and provided with an upper portion hinged to the lower portion, pipes extending through the casing and communicating with the interior of the radiator to supply air thereto to maintain combustion therein and to draw off the products of combustion, a perforated burner-tube supported in the axis of the radiator with one end extending through the end of said radiator, a funnel on the end of the burner-tube outside the radiator, an oil-supply pipe extending through the casing, and a nozzle on the end of the supply-pipe extending into said funnel, and an exhaust-pipe in the opposite end of the casing and supporting the end of the radiator, one end of said tube being supported by said funnel, and means for supporting said tube at the other end from within the radiator.

2. In a vehicle-heater, a casing having integral securing-ears and openings for the admission of air, a hinged cover with openings, and a movable plate coöperating therewith, a perforated burner-tube extending lengthwise of said casing, a cylindrical radiator inclosing said tube, said tube being supported from within said radiator and out of contact with the walls thereof, means for supplying air to said radiator, an exhaust-pipe from said radiator, and a fuel-supply to said burner-tube, the end of said tube extending through one end of the radiator and having a funnel-shaped portion between the end of the radiator and casing, said radiator having radial hollow protuberances.

In testimony whereof I affix my signature in presence of two witnesses.

WILLIAM R. MARENTETTE.

Witnesses:
OTTO F. BARTHEL,
THOS. S. LONGSTAFF.